US006921424B2

(12) United States Patent
Bugli et al.

(10) Patent No.: US 6,921,424 B2
(45) Date of Patent: Jul. 26, 2005

(54) DUST PRE-SEPARATOR FOR AN AUTOMOBILE ENGINE

(75) Inventors: Neville J. Bugli, Novi, MI (US); James J. Kempf, Canton, MI (US); William C. Montgomery, Canton, MI (US); Charles B. Peterson, Royal Oak, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 253 days.

(21) Appl. No.: 10/213,899

(22) Filed: Aug. 6, 2002

(65) Prior Publication Data

US 2004/0025481 A1 Feb. 12, 2004

(51) Int. Cl.$^7$ .............................................. B01D 45/12
(52) U.S. Cl. ........................ 55/385.3; 55/396; 55/412; 55/457
(58) Field of Search .............................. 55/396, 385.3, 55/394, 411, 412, 423, 432, 457

(56) References Cited

U.S. PATENT DOCUMENTS

| 379,009 A | | 3/1888 | Rycke |
| 1,215,935 A | * | 2/1917 | Hickman .................. 55/412 |
| 2,847,087 A | | 8/1958 | Johnson |
| 3,461,652 A | | 8/1969 | Sato |
| 3,517,821 A | | 6/1970 | Monson et al. |
| 3,616,619 A | | 11/1971 | Klein |
| 3,713,280 A | | 1/1973 | Keller et al. |
| 3,740,929 A | | 6/1973 | Gordon et al. |
| 3,885,935 A | | 5/1975 | Nutter |
| 3,895,930 A | | 7/1975 | Campolong |
| 4,159,899 A | | 7/1979 | Deschenes |
| 4,238,210 A | | 12/1980 | Regehr et al. |
| 4,311,494 A | | 1/1982 | Conner et al. |
| 4,390,426 A | | 6/1983 | Vicard |
| 4,629,481 A | | 12/1986 | Echols |
| 4,853,010 A | * | 8/1989 | Spence et al. .................. 96/52 |
| 6,083,291 A | | 7/2000 | Okada et al. |

FOREIGN PATENT DOCUMENTS

| GB | 1 183 912 | 3/1970 |
| GB | 1 526 509 | 9/1978 |
| GB | 2 019 748 | 11/1979 |
| GB | 2 266 065 | 10/1993 |

* cited by examiner

Primary Examiner—Robert A. Hopkins
(74) Attorney, Agent, or Firm—Brinks Hofer Gilson & Lione

(57) ABSTRACT

A pre-separator removes contaminants from dirty air and an air intake system of an automobile engine. The pre-separator includes a central body connected to a plurality of vanes, the central body including a leading nose-cone portion and a trailing nose-cone portion. An exit tube defines an outlet that is sized and positioned relative to the central body. The pre-separator is capable of easy packaging within the air intake system, while minimizing the restriction and maximizing horsepower of the engine. In one embodiment, the separation efficiency, the restriction, and acoustic tuning may be selectively controlled for the particular application.

20 Claims, 1 Drawing Sheet

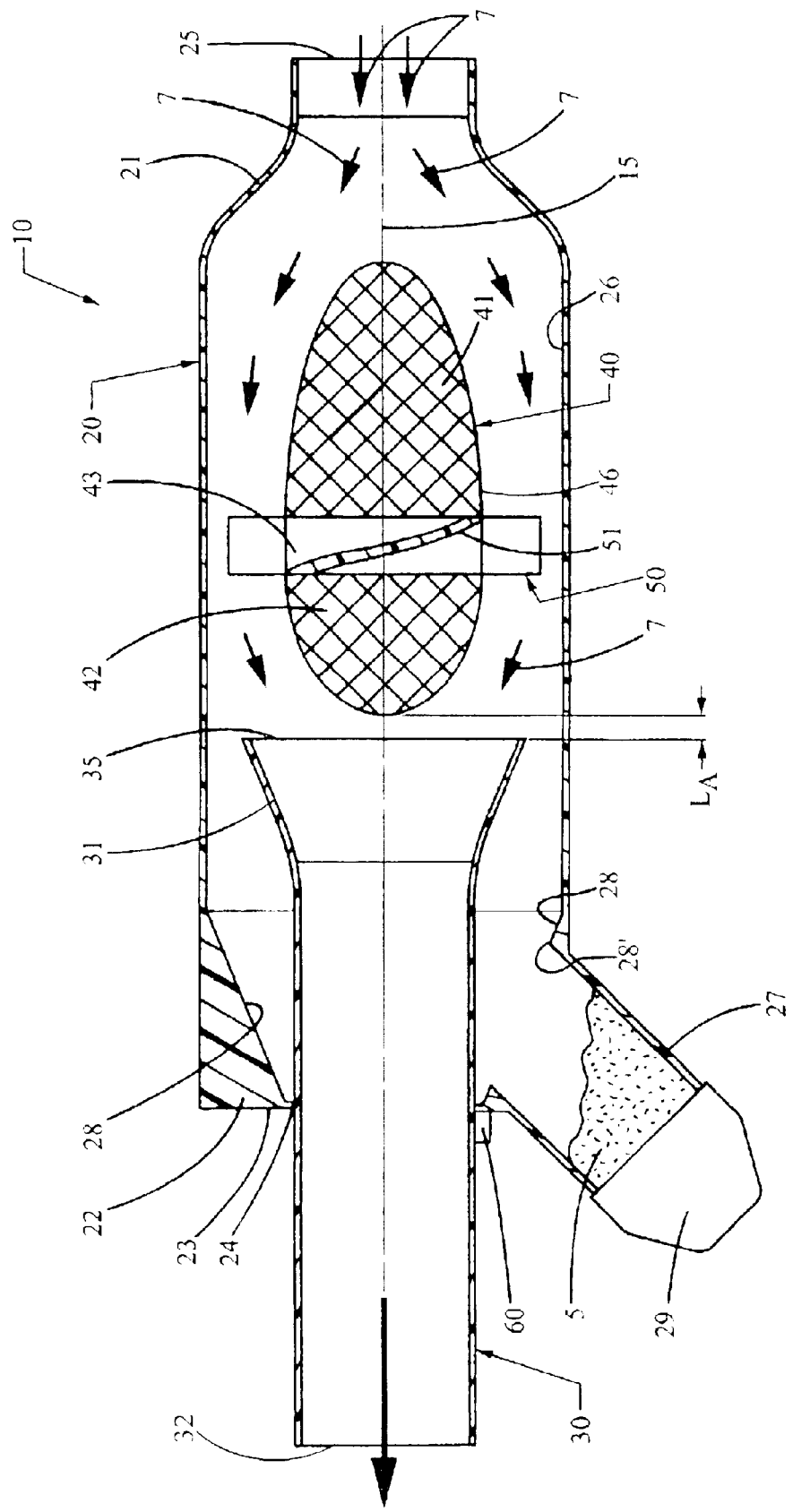

DUST PRE-SEPARATOR FOR AN AUTOMOBILE ENGINE

FIELD OF THE INVENTION

The present invention relates generally to inertia type pre-separators for removing contaminants from a stream of gas, and more particularly relates to vane separators for engine air cleaners.

BACKGROUND OF THE INVENTION

Automobile engine air filtration systems suffer from a finite and moderate dust-holding capacity. Higher dust capacities are required when driving under severe dusty driving conditions. Furthermore, engine air filters may be ill-equipped to deal with water, snow, salt, or large contaminants. In other applications, such as process industries or engines for other vehicles, pre-separator devices are sometimes used to improve the contaminant removing capacity of the filtration system. Under heavy conditions, a pre-separator may extend the life of the air cleaner filter by three to five times its normal life span.

A cyclone-type separator is typically employed because of its high capacity and efficiency for removing contaminants. A blower, compressor, or pump forces the gas tangentially into a tapered tube, thereby creating a spinning vortex. The centrifugal force created by the vortex separates particles from the stream of gas, as the gas accelerates as it is forced through the tapered tube. The contaminants are forced from the center of the stream to the walls of the tube, and are collected in a chamber for removal. An outlet tube is positioned within the center of the tapered tube, and clean air is sucked from the center of the vortex.

While typical cyclone separators achieve a high particle separation efficiency, these separators suffer significant drawbacks which limit their use with automotive engine applications. First, there is a significant energy requirement to create this vortex and withdraw the clean air, which in turn burdens the engine and reduces horsepower. Further, the high flow velocity along the large inner surface area of the tube creates a large pressure drop and corresponding head loss, also resulting in reduced horsepower. Additionally, the tapered tube necessary to create the centrifugal forces is too large for the already restricted confines of the engine bay. Finally, the cyclone separator must be positioned in a vertical orientation for proper operation, further limiting its ability to be included in the filtration system for an automotive engine.

Accordingly, there exists a need to provide a pre-separator that can be easily packaged as a part of the filtration system for an automotive engine, while providing the requisite contamination separation efficiency without significant horsepower loss to the engine.

BRIEF DESCRIPTION OF THE DRAWING

The accompanying drawing incorporated in and forming a part of the specification illustrates several aspects of the present invention, and together with the description serves to explain the principles of the invention. In the drawing:

The FIGURE is a cross-sectional view of an embodiment of a pre-separator constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the FIGURE, an embodiment of the separator or pre-separator is identified generally by reference numeral 10. The separator 10 is designed to be positioned in-line in an air intake system (AIS), upstream of the engine air filter. Accordingly, the pre-separator 10 can be integrally formed with the filtration system of the engine. Pre-separator 10 is utilized to remove the larger contaminants from the incoming air, such as dirt, dust, water, snow, ice, salt, and the like, while the air filter (not shown) attached downstream of the pre-separator 10 removes the remaining finer particles from the airflow.

As described in more detail herein, the pre-separator 10 is designed to provide excellent contaminant removal, while minimizing the pressure drop across the pre-separator 10 by reducing the restriction. This in turn minimizes the horsepower draw of the pre-separator 10 and thus increases the horsepower available to the remainder of the vehicle. Further, the pre-separator 10 can be easily packaged and positioned in any manner (i.e. horizontal, vertical, diagonal, etc.) also simplifying packaging.

The pre-separator 10 generally comprises a tubular housing 20 having a first end 21 and a second end 22, the housing 20 defining a central axis denoted by line 15 in the FIGURE. The second end 22 is preferably closed by an end wall 23 while the first end 21 is open to define an inlet 25. As shown in the FIGURE, the first end 21 of the housing 20 tapers to define an inlet 25 that has a diameter much smaller than the diameter of the tubular housing 20.

An exit tube 30, aligned on the central axis 15, projects into the housing 20 at the second end 22 thereof. More specifically, the exit tube 30 projects through an aperture 24 formed in the end wall 23. The downstream end 32 of the exit tube 30 (located outside of the housing 20) is adapted for connection to the inlet of the filter housing of the filter. A free end 31 of the exit tube 30 defines an outlet 35 from the pre-separator 10 for receiving the cleaned airflow flowing downstream from the inlet 25. Preferably, the free end 31 of the exit tube is outwardly flared or bell shaped, as shown in the FIGURE, to define an enlarged outlet 35.

The tubular housing 20 also includes a collection chamber 27 adjacent the second end 22 thereof. The chamber 27 is designed to collect and store contaminants 5 separated from the dirty air by the pre-separator 10. Inner baffles 28 taper inwardly from the housing 20 to reduce the effective diameter of the housing 20, and the collection chamber 27 extends from these baffles 28 to project outwardly from the housing 20. The collection chamber 27 includes a vacutator valve 29 for removing the dust or other contaminants collected in the chamber 27.

The pre-separator 10 further includes a central body 40 having a plurality of vanes 50 attached to the outer surface of the body 40 and linking the body 40 to the tubular housing 20. Ideally, the vanes are equidistantly spaced around the circumference of the body 40. The vanes 50 preferably number in the range of three to twelve vanes, and the cross-section of one vane has been shown as indicated by reference numeral 51. The vanes 50 preferably have a slightly curved shape, and extend from the outer surface 46 of the central body 40 to the inner surface 26 of the housing 20. Each vane 51 is structured and positioned to impart both a radial and a tangential component to air flowing axially along the central axis 15. Accordingly, by sequentially spacing a plurality of vanes 50 about the outer surface of the body 40, the incoming air may be redirected by the vanes to have a swirling or spiral path.

While this particular vane structure and shape 51 has been shown in the FIGURE, any of the numerous vane structures and shapes known in the art may be employed with the separator 10 of the present invention. For example, the vanes 50 may redirect all of the incoming air, or they may allow some straight through flow. Furthermore, the vanes 50 may be curved in a radial direction, be curved in a tangential direction, in both directions, or rather may be flat structures that are simply angled relative to the central axis 15. In any event, all the vanes 50 are preferably similarly sized and shaped to provide a uniform swirl, although each vane could differ from the others.

The central body 40 is concentrically aligned with the central axis 15. The body 40 is aerodynamically shaped to smooth out the flow and reduce the effective restriction of the pre-separator 10. This in turn lowers the pressure drop and reduces the load on the engine, increasing available horsepower. As shown in the FIGURE, the central body 40 includes a leading nose-cone portion 41 and a trailing nose-cone portion 42. A middle cylindrical portion 43 is interposed between the leading and trailing nose-cones 41, 42, and connects the two cones. The middle cylindrical portion 43 has a constant diameter defining the maximum diameter of the central body 40, while the leading and trailing nose-cones 41, 42 are both conically shaped to narrow at their free ends.

Preferably, the leading nose-cone 41 has an axial length greater than the trailing nose-cone portion 42 giving the body 40 an egg-shaped configuration. Most preferably, the trailing nose-cone portion 42 has an axial length in the range of 30 to 70 percent of the axial length of the leading nose-cone portion 41. In the illustrated embodiment, the middle cylindrical portion 43 has an axial length of about ⅙ to ½ of the leading nose-cone portion 41. Based on the relative lengths of the leading nose-cone portion 41 and the trailing nose-cone portion 42, the leading nose-cone portion 41 has a smaller slope and a more gradual increase in diameter as compared to the trailing nose-cone portion 42, which has a greater slope and a faster change in diameter. This configuration greatly reduces the restriction by smoothing out the airflow.

Preferably, the vanes 50 are only attached to the middle cylindrical portion 43, and hence have an axial length similar to the middle portion 43. The radial length of the vane 50 corresponds to the annular passage defined between the central body 40 and the housing 20. In the most preferred embodiment, the vanes 50 each have an axial length that is approximately equal to the radial length. Preferably, the maximum diameter of the central body 40, and more particularly the middle cylindrical portion 43, is about 40 to 80 percent of the inner diameter of the tubular housing 20. These structural configurations also assist in reducing the restriction.

In operation, air enters the tubular housing 20 at the inlet 25 at a given flow rate determined by the particular engine in its air intake system. The path of the air has been indicated by the plurality of arrows denoted by reference numeral 7. The airflows downstream from the inlet 25 and begins to receive a radial component and move outwardly towards the inner wall of the housing 20. This radial component component of the airflow path is gradual as determined by the gently sloping surface of the leading nose-cone portion 41. Air then flows around the leading nose-cone portion 41 and through the plurality of vanes 50. The vanes 50 induce a swirling motion in the airflow, preferably providing an additional radial component and a tangential component to the airflow.

It will be recognized that the size of the airflow passage decreases with the introduction of the leading nose-cone portion 41, and then further with the introduction of the vanes 50. Accordingly, the airflow is accelerating through this portion of the separator 10. The accelerated and hence high velocity swirling airflow leaving the middle cylindrical portion 43 of the central body 40 results in contaminant particles in the airflow moving outward and against the inner wall 26 of the housing 20 by virtue of the centrifugal force imposed thereon. As air continues downstream, the swirling airflow path continues to separate the contaminants by forcing them to the outer periphery of the housing 20. The "cleaner" airflow quickly moves radially inwardly as guided by the trailing nose-cone portion 42. The outlet 35 of the exit tube 30 is positioned adjacent and preferably immediately downstream of the trailing nose-cone portion 42 to receive the cleaner airflow.

It can be seen that the sharp slope of the trailing nose cone portion 42 assists in separating the contaminants to the outer periphery of the housing 20, while providing a smooth transition as air flows towards the central axis 15 and into the exit tube 30. Additionally, the angled or sloped free end 31 of the exit tube 30, provides a smooth flow path for the air and further lowers the overall restriction imposed by the separator 10. Preferably, the free end 31 is outwardly flared or bell shaped, or alternately, it has a shape corresponding to the curvature of the trailing nose-cone portion 42 to provide a consistent and smooth flow path.

In an automotive engine, the amount of restriction imposed by a separator 10 will act to reduce the horsepower of the engine, mainly because the engine needs to spend more power pulling in the required amount of air. Accordingly, the pre-separator 10 of the present invention has been structured to minimize the size of the restriction while providing sufficient separation of contaminants. The structure of the nose-cone portions 41, 42, relative to the housing 20 and to each other, provides an airflow path that gradually moves radially outwardly, and then imparts a swirling motion to remove contaminants by centrifugal force, and then quickly moves radially inwardly toward the central axis 15 and the exit tube 30. Furthermore, the outlet 35 of the exit tube 30 preferably has a diameter equal to or slightly smaller than the largest diameter of the central body 40 (i.e. the diameter of the middle cylindrical portion 43). This configuration helps to maximize the efficiency of the contaminant separation, while also minimizing the overall restriction.

The highly contaminated swirling airflow around the outer periphery of the housing 20 flows downstream past the exit tube 30 and begins to move radially inwardly by virtue of the baffles 28. Eventually, the contaminants 5 enter into the chamber 27 until they are scavenged by way of the vacutator valve 29. The sharp discontinuity or radial flange 28' formed by the baffle 28 and the radially outwardly extending chamber 27 assists in keeping all of the removed contaminants such as dust 5 in the chamber 27.

Another unique aspect of the present invention is the provision of an adjustable exit tube 30. In its preferred form, the exit tube 30 is slidably disposed within the housing 20. Accordingly, the distance between the outlet 35 and the downstream end of the trailing nose-cone portion 42 is selectively adjustable. It will also be recognized that the central body 40 could alternately be axially adjustable. An inner surface of the aperture 24 formed in the end wall 23 provides a guide surface for supporting the exit tube 30 through axial adjustment relative to the housing 20 and the central body 40.

A latch 60 may be provided to selectively fix the exit tube 30 to the housing 20, and more particularly, the end wall 23. The latch 60 may take any of numerous forms which are well known in to a person of skill in the art, and may include spring loaded pin and socket, cotter pins, snap features, male/female members, twist-lock function, friction fit, friction brake or clutch, or any mechanism to selectively affix the tube 30 to the housing 20. Preferably, an outer surface of the exit tube 30 is marked with a scale to indicate the distance between the trailing end of the central body 40 and the outlet 35. It is also preferable to keep the outlet 35 close to body 40 as described above, so the distance '$L_A$' may be selectively variable between zero and the maximum diameter of the body 40 (generally taken at middle portion 43), and most preferably between zero and one-half the diameter of the body 40.

Accordingly, it will be recognized that the overall restriction imposed by the pre-separator 10 can be adjusted based on the axial position of the exit tube 30, and more particularly a distance between the outlet 35 and the central body 40. For example, differently sized engines and different types of engines produce different rates of airflow through the air intake system. Accordingly, the exit tube 30 may be adjusted to optimize the two variables of separator efficiency and separator restriction. This provides for the high efficiency in terms of contaminant separation, while minimizing the load imposed upon the engine and hence maximizing horsepower.

Furthermore, there are certain acoustic effects which can be positively controlled. It will be recognized that the tubular housing 20 acts as a resonator and can attenuate noise in the system. Additionally, the length the exit tube 30 projects upstream from the end wall 23 into the housing 20 will determine the wavelength at which noise will be attenuated. Therefore, by adjusting the position of the exit tube, acoustic tuning can be accomplished, while also balancing the variables of separation efficiency and pressure drop (restriction).

The foregoing description of various embodiments of the invention has been presented for purposes of illustration and description. It is not intended to be exhaustive or to limit the invention to the precise embodiments disclosed. Numerous modifications or variations are possible in light of the above teachings. For example, while the cross-sectional view of the pre-separator 10 indicates that the components are constructed of plastic, it will be recognized that the components can be constructed of any relatively rigid material, including metal or composites. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A pre-separator for removing contaminants from dirty air in an air intake system of an automobile engine, the pre-separator comprising:

a tubular housing having a first end and a second end, the first end defining an inlet and the housing defining a central longitudinal axis;

an exit tube projecting into the housing from the second end, a free end of the exit tube increasing in diameter to define an outlet;

a central body located within the housing and between the inlet and outlet, the central body including a leading nose-cone portion, a middle cylindrical portion, and a trailing nose-cone portion;

a plurality of vanes attached to the central body and extending radially and engaging the tubular housing, the plurality of vanes being structured and positioned to impart a swirling motion to the dirty air flowing from the inlet;

the trailing nose-cone portion having a slope greater than the leading nose-cone portion to define a airflow path that gradually moves radially outwardly then quickly moves radially inwardly towards the central axis; and the outlet of the exit tube having a diameter equal to or less than a diameter of the middle cylindrical portion of the central body, the outlet being positioned proximate the end of the trailing nose-cone and within an axial distance of equal to or less than the diameter of the middle cylindrical portion of the central body to receive the quickly moving radial inward flow of air.

2. The pre-separator of claim 1, wherein the trailing nose-cone portion extends an axial distance less than the leading nose-cone portion.

3. The pre-separator of claim 2, wherein the trailing nose-cone portion extends an axial distance in the range of 30% to 70% of the axial distance of the leading nose-cone portion.

4. The pre-separator of claim 1, wherein the outlet is positioned within one-half the diameter of the middle cylindrical portion.

5. The pre-separator of claim 1, wherein the sloped free end of the exit tube is bell-shaped.

6. The pre-separator of claim 1, wherein the sloped free end of the exit tube has a shape corresponding to the sloped shape of the trailing nose-cone.

7. The pre-separator of claim 1, wherein the tubular housing has a constant diameter in the area circumscribing the central body.

8. The pre-separator of claim 1, wherein the vanes extend axially from a front edge of the middle cylindrical portion to a rear edge of the middle cylindrical portion.

9. The pre-separator of claim 1, wherein the exit tube is axially adjustable relative to the central body to selectively position the outlet relative to the end of the trailing nose cone.

10. The pre-separator of claim 1, wherein the greatest diameter of the central body is 40 to 80 percent of the inner diameter of the tubular housing.

11. A pre-separator for removing contaminants from dirty air in an air intake system of an automobile engine, the pre-separator comprising:

a tubular housing having a first end defining an inlet;

an exit tube extending into the housing at a second end thereof, a free end of the exit tube defining an outlet;

a central body located within the housing, the central body having a plurality of vanes attached to thereto and extending radially to engage the housing, the plurality of vanes being structured and positioned to impart a swirling motion to the dirty air flowing from the inlet downstream to the outlet; and the distance between the exit tube and the central body being adjustable to selectively position the outlet relative to a downstream end of the central body;

the distance between the exit tube and the central body being adjustable between 0 and the greatest diameter of the central body.

12. The pre-separator of claim 11, wherein the central body includes a leading nose-cone at an upstream end of the central body, and a trailing nose-cone at a downstream end of the central body.

13. The pre-separator of claim 12, wherein the trailing nose-cone portion extends an axial distance less than the leading nose-cone portion.

14. The pre-separator of claim 11, wherein the free end of the exit tube is bell-shaped.

15. The pre-separator of claim 11, further comprising a latch to selectively fix the distance between the exit tube and the central body.

16. The pre-separator of claim 11, wherein the exit tube is axially adjustable relative to the housing and the central body.

17. The pre-separator of claim 16, further comprising a latch for selectively fixing the exit tube to the housing to set the distance between the outlet and the central body.

18. The pre-separator of claim 17, wherein the second end of the housing includes an aperture receiving the exit tube, an inner edge of the aperture forming a guide surface for supporting the exit tube through axial adjustment, the latch fixing the exit tube to the guide surface.

19. The pre-separator of claim 11, wherein the outer surface of the exit tube includes a scale for assisting adjustment of the exit tube.

20. The pre-separator of claim 11, wherein the greatest diameter of body is 40 to 80 percent of the inner diameter of the tubular housing.

* * * * *